(12) United States Patent
Takahashi

(10) Patent No.: US 6,973,265 B2
(45) Date of Patent: Dec. 6, 2005

(54) SOLID STATE IMAGE PICK-UP DEVICE AND IMAGE PICK-UP APPARATUS USING SUCH DEVICE

(75) Inventor: Hidekazu Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 10/247,283

(22) Filed: Sep. 20, 2002

(65) Prior Publication Data

US 2003/0059216 A1 Mar. 27, 2003

(30) Foreign Application Priority Data

Sep. 27, 2001 (JP) ......................... 2001-297117

(51) Int. Cl.$^7$ ............................ G03B 7/08; G03B 13/36
(52) U.S. Cl. ........................ 396/121; 396/234
(58) Field of Search ................ 396/121–123, 396/233, 234

(56) References Cited

U.S. PATENT DOCUMENTS 5,302,997 A    4/1994    Cocca ................... 354/432
5,313,246 A  * 5/1994    Takagi et al. ........... 396/122
6,215,961 B1 * 4/2001    Mukai et al. ............ 396/121

FOREIGN PATENT DOCUMENTS

EP    0 977 427 A2    2/2000    .......... H04N/3/15
JP    2000-180706     6/2000    .......... G02B/7/28

* cited by examiner

Primary Examiner—W. B. Perkey
(74) Attorney, Agent, or Firm—Fitzpatrick, Cella, Harper & Scinto (57) ABSTRACT

In order to realize a photometry/ranging solid state image pick-up device having high performance AE and multi-point functions by a single chip, a plurality of ranging photoelectric conversion element columns 1A to 7A and 1B to 7B for multi-point ranging and automatic focusing of a plurality of positions in a photographing area, spot photometry photoelectric conversion elements S1 to S7 for spot photometry of a plurality of ranging positions, and a whole area photometry photoelectric conversion element WO for photometry of a whole of the photographing area are integrated on the same semiconductor substrate 107. By comparing a spot photometry value with a whole area photometry value, it becomes possible to distinguish between a front light scene and a rear light scene.

15 Claims, 14 Drawing Sheets

WIDE IMAGE PICK-UP
(USE WHOLE AREA)

FIG. 11B

STANDARD IMAGE PICK-UP
(USE S2 TO S6, M1 TO M4, T1)

FIG. 11C

TELE IMAGE PICK-UP
(USE S3 TO S5, T1)

SOLID STATE IMAGE PICK-UP DEVICE AND IMAGE PICK-UP APPARATUS USING SUCH DEVICE

BACKGROUND OF THE INVENTION

1. Field of the Invention

The present invention relates to a solid state image pick-up device having a photometry function and an automatic focusing function. More particularly, the invention relates to a photometry/ranging solid state image pick-up device to be used with a lens-shutter compact camera and to an image pick-up apparatus using such a device.

2. Description of the Related Art

Figure 16:
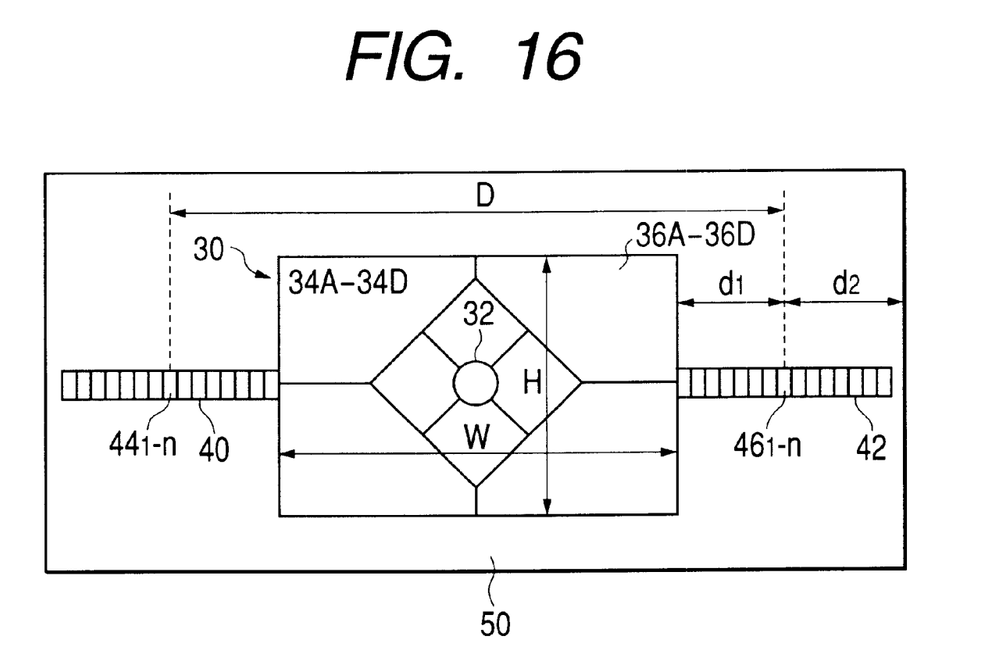
FIG. 16 is a diagram showing a conventional automatic focusing sensor.

A solid state image pick-up device disclosed, for example, in U.S. Pat. No. 5,302,997 is used as an automatic focusing (AF) sensor with a photometry (auto exposure: AE) function of a lens-shutter compact camera. A schematic layout of a solid image pick-up device is shown in FIG. 16. In FIG. 16, reference numeral 30 represents a photometry sensor array, reference numeral 32 represents a photometry sensor segment, 34A to 34D represent photometry inner segments, 36A to 36D represent photometry outer segments, reference numerals 40 and 42 represent ranging sensor arrays, reference numerals $44_{1-n}$ and $44_{1-n}$ represent pixels, reference numeral 50 represents an Si semiconductor substrate, H and W represent photometry region sizes, and D represents a base line length.

Two linear sensors 40 and 42 are used in order to measure a distance of an object through phase difference detection. An AF sensitivity representative of a ranging precision can be expressed by:

$$AF\ sensitivity = D \times f / P$$

where P is a pixel pitch and f is a focal length of a range taking lens. A solid state image pick-up device having an AF sensitivity of about 5.000 is presently available. If the pixel pitch is about 10 μm and a lens focal length is several mm, the base line length D is in the range from 5 mm to 8 mm. An invalid region exists therefore between the linear sensors 40 and 42. However, since the AE sensor 30 is formed in this area, the area of the semiconductor substrate can be used efficiently. The AE and AF sensors are implemented on one chip, this contributing to compactness and low cost of a camera.

This AF sensor has only one central ranging point and does not concern about multi-point ranging. In addition, the photometry function is not satisfactory in that a proper exposure cannot be obtained for a rear light scene, and the photometry range is narrow because an output of the photometry sensor is linear.

SUMMARY OF THE INVENTION

The invention has been made in order to solve the above-described problems. An object of the invention is to provide a photometry/ranging solid state image pick-up device having a photometry function suitable for multi-point ranging.

In order to achieve the above object, an embodiment provides a photometry/ranging solid state image pick-up device comprising: a plurality of ranging photoelectric conversion elements for multi-point ranging and automatic focusing of a plurality of positions in a photographing area; first photometry photoelectric conversion elements for spot photometry of each ranging position of each of the ranging photoelectric conversion elements; and a second photometry photoelectric conversion element for photometry of the photographing area, wherein the ranging photoelectric conversion elements, the first photometry photoelectric conversion elements and the second photometry conversion element are integrated on a same semiconductor substrate.

Another embodiment of the invention provides a photometry/ranging solid state image pick-up device comprising: a plurality of ranging photoelectric conversion elements for multi-point ranging and automatic focusing of a plurality of positions in a photographing area; first photometry photoelectric conversion elements for spot photometry of each ranging position of each of the ranging photoelectric conversion elements; a second photometry photoelectric conversion element for photometry of the photographing area; means for logarithmically compressing photoelectric current output from each of the first and second photometry photoelectric conversion elements; means for controlling an accumulation time of the ranging photoelectric conversion elements; a timing generator circuit for driving the ranging photoelectric conversion elements and the first and second photometry photoelectric conversion elements; a band gap circuit for generating a reference potential; and a thermometer circuit for monitoring a temperature of a semiconductor substrate, respectively integrated on the same semiconductor substrate.

DESCRIPTION OF THE PREFERRED EMBODIMENTS

Embodiments of the invention will be described in detail with reference to the accompanying drawings.

First Embodiment

Figure 1:
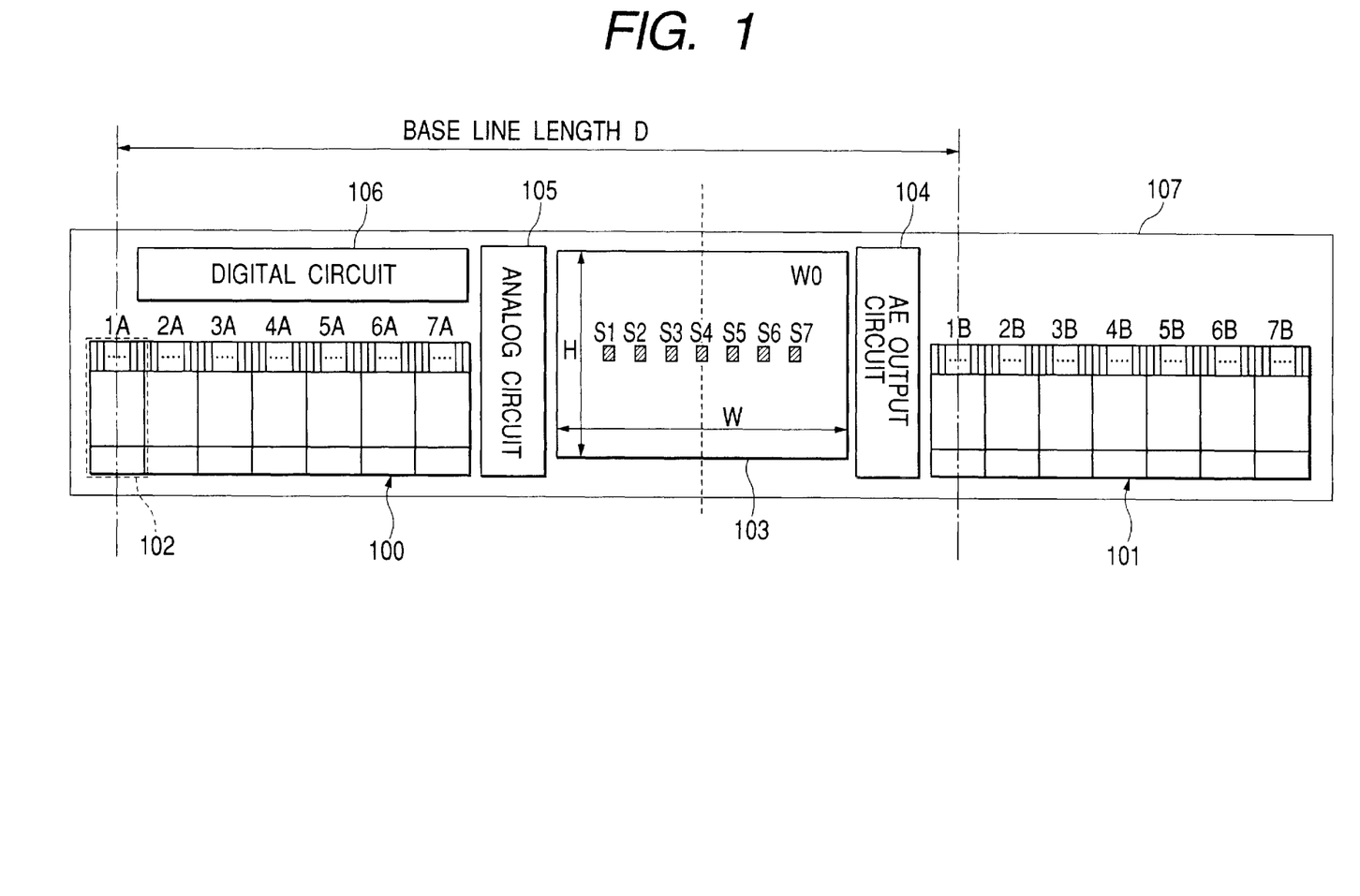
FIG. 1 is a plan view showing the layout of a photometry/ranging solid image pick-up device according to a first embodiment of the invention.
Figure 2:
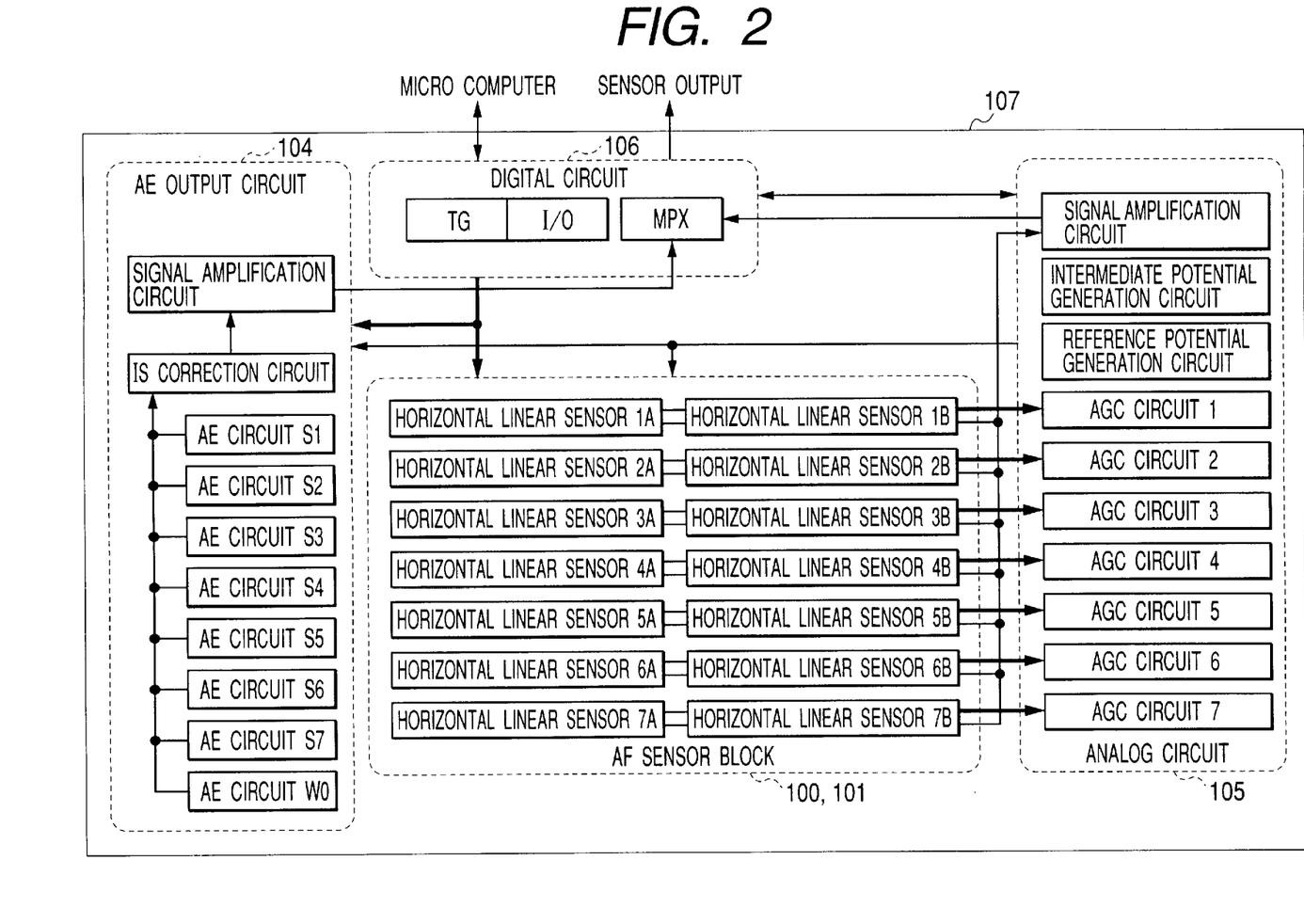
FIG. 2 is a block diagram of the first embodiment.

FIG. 1 is a plan view showing the layout of a photometry/ranging solid image pick-up device according to a first embodiment of the invention, and FIG. 2 is a block diagram of the device. In FIG. 1, reference numerals 100 and 101 represent AF sensor blocks for multi-point ranging which performs automatic focusing at a plurality of positions in a photographing area. Each of the AF sensor blocks 100 and 101 has seven AF linear sensor circuits 102. The AF sensor circuits of the AF sensor block 100 are represented by 1A to 7A, and the AF sensor circuits of the AF sensor block 101 are represented by 1B to 7B.

Reference numeral 103 represents an AE sensor photodiode area including seven spot photometry photodiodes S1 to S7 and a whole area photometry photodiode WO. Reference numeral 104 represents an AE output circuit for processing an AE sensor signal. Reference numeral 105 represents an analog circuit including an AGC circuit and the like to be later described. Reference numeral 106 represents a digital circuit including a timing generator circuit, and Multiplexer and I/O circuit. Reference numeral 107 represents a Si semiconductor substrate. In this embodiment, the AF sensor blocks 100 and 101, AF sensor diode area 103, AE output circuit 104, analog circuit 105 and digital circuit 106 are all integrated on the Si substrate 107. D represents a base line length, and H and W represent vertical and horizontal lengths of the photometry area.

Figure 3:
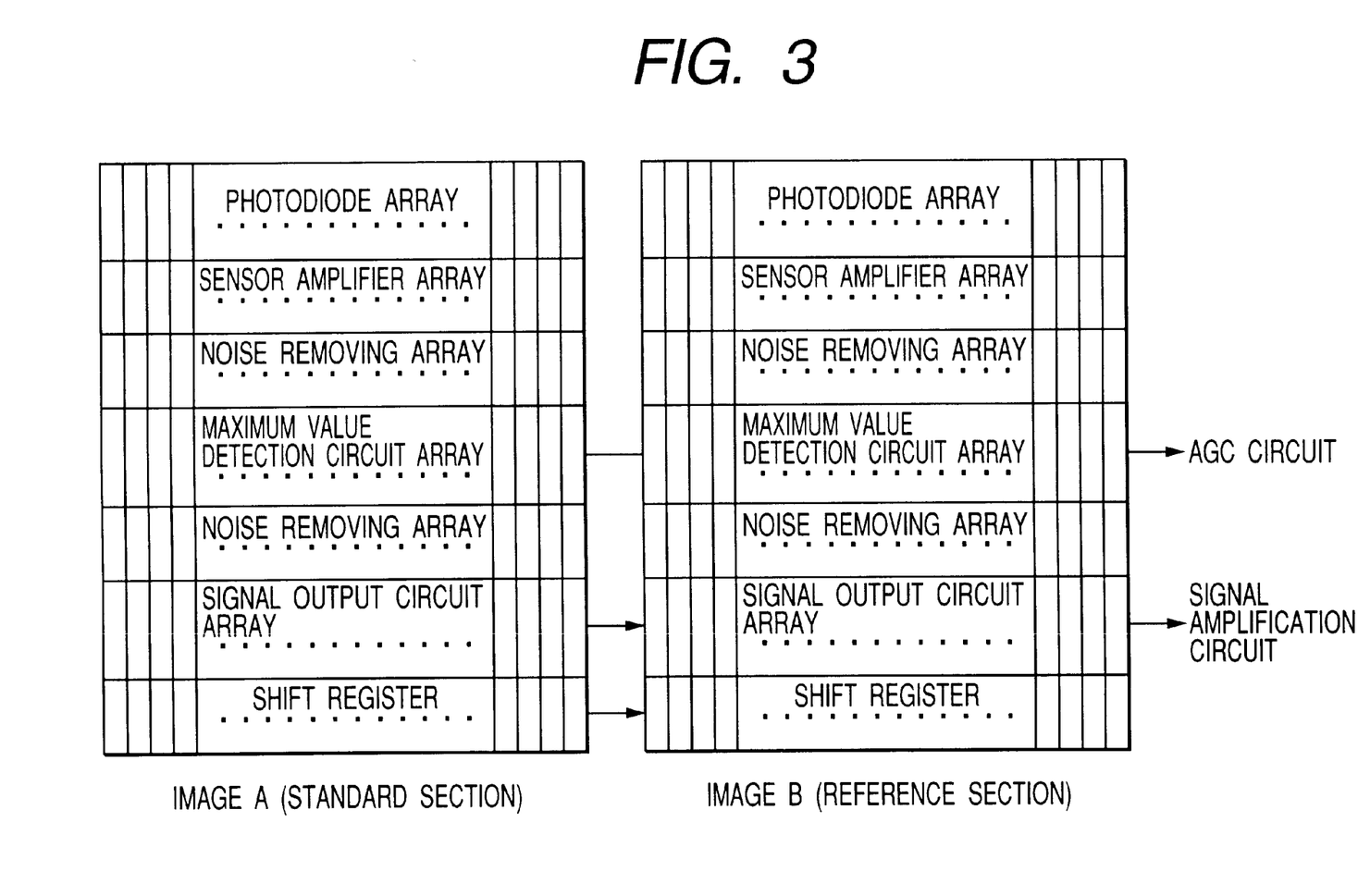
FIG. 3 is a block diagram showing an AF linear sensor circuit of the first embodiment.
Figure 4:
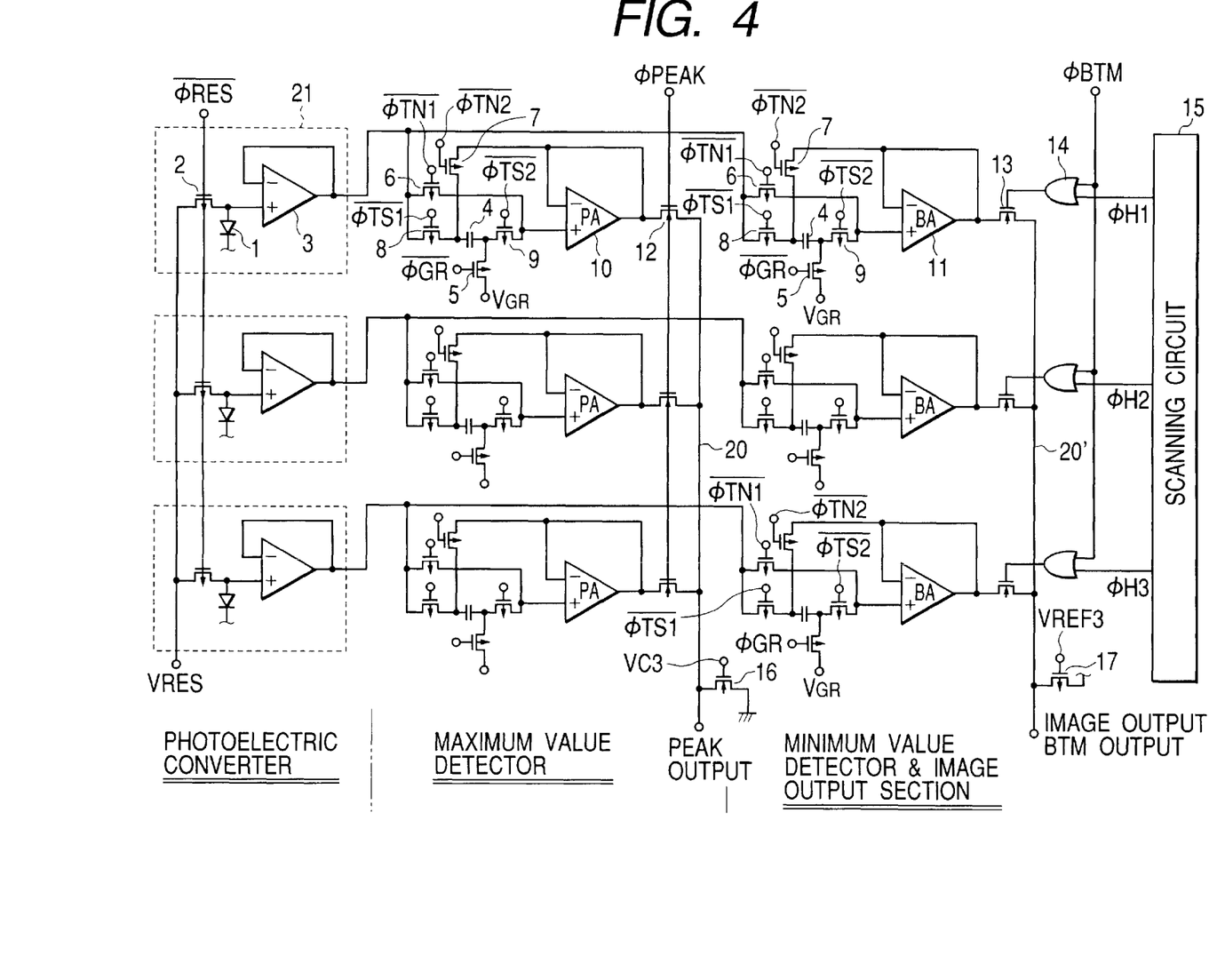
FIG. 4 is a circuit diagram showing an AF linear sensor circuit of the first embodiment.

As described earlier, the AF sensor blocks 100 and 101 are constituted of the AF linear sensor circuits 1A to 7A and 1B to 7B. FIG. 3 is a block diagram of the AF linear sensor circuit, and FIG. 4 is a circuit diagram showing the internal connections of the AF linear sensor circuit. The CMOS AF linear sensor shown in FIGS. 3 and 4 was proposed by the present applicant in JP-A-2000-180706.

In FIG. 3, an image A (standard section) corresponds to the AF linear sensors 1A to 7A, and an image B (reference section) corresponds to the AF linear sensors 1B to 7B. For each of the images A and B, there are provided a photodiode array, a sensor amplifier array, a noise removing circuit array, a maximum value detection circuit array, a noise removing circuit array, a signal output circuit array and a shift register array.

The photodiode array includes pn junction photodiodes for performing photoelectric conversion. The sensor amplifier array is a differential amplifier circuit for amplifying photoelectrically converted signals output from the photodiodes. The maximum value detection circuit array is a circuit for detecting the maximum value of signals output from the differential amplifier circuit. The signal output circuit array (minimum value detection circuit array) is a circuit for detecting the minimum value of signals output from the differential amplifier circuit (or a circuit for amplifying a sensor signal and outputting it). The shift resister array (scanning circuit) is a circuit for outputting a sensor signal serially. These constituent elements shown in FIG. 3 will be detailed with reference to the circuit diagram shown in FIG. 4. The maximum and minimum value detection circuits shown in FIG. 4 include the noise removing circuit arrays shown in FIG. 3.

In this embodiment, ranging is performed based upon phase difference detection made by pairs of the AF sensors 1A and 1B, 2A and 2B, 3A and 3B, 4A and 4B, 5A and 5B, 6A and 6B, and 7A and 7B, respectively. Horizontal linear sensors 1A to 7A shown in FIG. 2 correspond to the AF sensor blocks 1A to 7A shown in FIG. 1, and horizontal linear sensors 1B to 7B shown in FIG. 2 correspond to the AF sensor blocks 1B to 7B shown in FIG. 1. Phase difference values detected by the respective pairs of the sensors 1A to 7A and 1B to 7B are output to corresponding AGC circuits 1 to 7.

The AF sensor circuit shown in FIG. 4 will be described. In FIG. 4, reference numeral 1 represents a pn junction photodiode for performing photoelectric conversion. Reference numeral 2 represents a reset MOS transistor for resetting the potential of the photodiode to a potential VRES. Reference numeral 3 represents a differential amplifier. The photodiode 1, reset MOS transistor 2 and differential amplifier 3 constitute one photoelectric conversion pixel 21. Reference numeral 4 represents a clamping capacitor, and reference numeral 5 represents a MOS switch for setting a clamp potential. The clamping capacitor 4 and MOS switch 5 constitute a clamping circuit. Reference numerals 6 to 9 represent switching MOS transistors, reference numeral 10 represents a maximum value detection differential amplifier, and reference numeral 11 represents a minimum value detection differential amplifier. Each of the differential amplifiers constitutes a voltage follower circuit. Reference numeral 12 represents a maximum value output MOS switch, reference numeral 13 represents a minimum value output MOS switch, reference numeral 14 represents an OR circuit, reference numeral 15 represents a scanning circuit, and reference numerals 16 and 17 represent constant current MOS transistors. An n-MOS source follower circuit is used as the final stage of the maximum value detection circuit, whereas a p-MOS source follower circuit is used as the final stage of the minimum value detection circuit. Reference numeral 20 represents a common output line via which signals are output from the pixels.

In the AF sensor circuit structured as above, the noise clamping circuit is provide at the front stage of each of the maximum and minimum value detection circuits so that it is possible to remove reset noises generated by the photodiode and FPN generated by the sensor amplifier and maximum and minimum value detection circuits. When a minimum value is to be output, the constant current source at the output stage of each voltage follower circuit of the source follower type at the final output stage of each pixel is turned off to connect the output of each voltage follower circuit to the common output line. When an image signal is to be output, the constant current source at the output stage of each voltage follower circuit is turned on to sequentially connect each voltage follower circuit to the common output line and obtain a serial image signal. With these operations, the minimum value detection circuit and signal output circuit can be combined so that the chip can be made small.

The AE sensor photodiode area 103 has the whole area photometry photodiode WO and seven spot photometry photodiodes S1 to S7. The AE output circuit 104 includes a circuit for logarithmically compressing a photoelectric current output from each photodiode. AE sensor circuits S1 to S7 and an AE sensor circuit WO in an AE output circuit 104 shown in FIG. 2 correspond to the photodiodes S1 to S7 and WO shown in FIG. 1, and output a logarithmically compressed photoelectric current of the photodiodes S1 to S7 and WO.

Figure 5:
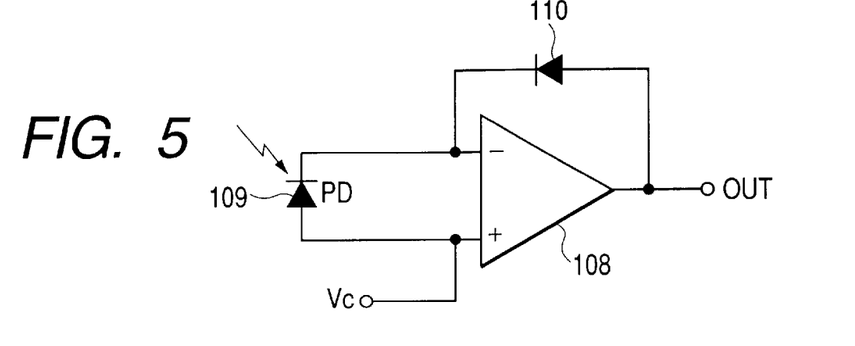
FIG. 5 is a circuit diagram of an AE sensor of the first embodiment.

FIG. 5 is a circuit diagram showing a specific example of each of the AE sensor circuits S1 to S7 and WO. These circuits correspond to the AE sensor circuits S1 to S7 and AE sensor circuit W0 shown in FIG. 2. In FIG. 5, reference numeral 108 represents a CMOS operational amplifier, reference numeral 109 represents a pn junction photodiode, and reference numeral 110 represents a pn junction diode. Since the potential across the pn junction photodiode 109 is a reference potential $V_c$, the pn junction photodiode 109 is in a zero bias state. Therefore, the depletion layer is suppressed from being broadened and a dark current is suppressed from being generated in the depletion layer. As a photoelectric current flows through the diode 110 from the photodiode 109, it is converted into voltage. In accordance with the current-voltage characteristics of the diode, a logarithmically converted output $V_{out}$ is given by:

$$V_{out}=V_c+(kT/q)\ln(I_p/I_s)$$

where k is the Boltzmann's constant, T is an absolute temperature, q is an elementary charge, $I_p$ is a photoelectric current, and $I_s$ is a reverse saturation current of the diode. An $I_s$ correction circuit (refer to FIG. 2) is practically used in order to suppress a change in the characteristics to be caused by $I_s$ variations. An output of the $I_s$ correction circuit is amplified by a signal amplification circuit and output to the digital circuit 106.

The analog circuit 105 is constituted of automatic gain control (AGC) circuits 1 to 7 for controlling the accumulation time of each AF sensor, a reference potential generation circuit (band gap circuit) for generating a reference potential, an intermediate potential generation circuit for generating an intermediate potential such as VRES and VGR necessary for the sensor circuits, and a signal amplification circuit for amplifying a signal and output it to an external. Each AF sensor is a charge accumulation type photoelectric conversion element. The reference potential is necessary for determining the reset and clamp potentials of the AF sensor.

Figure 6:
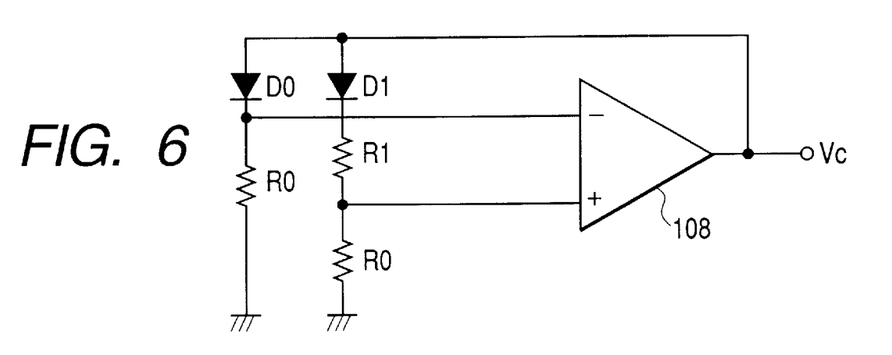
FIG. 6 is a diagram showing a band gap circuit of the first embodiment.

FIG. 6 shows an example of the band gap circuit having a CMOS circuit configuration. D0 and D1 represent a diode, R0 and R1 represent a resistor, and 108 represents an operational amplifier. With this configuration, the band gap circuit can be constituted of pn junction diodes or NPN transistors and the CMOS operational amplifier 108.

The digital circuit 106 is constituted of a timing generation circuit (TG) to be used for driving the sensor, an I/O circuit for communication with an external micro computer and a multiplexer (MPX) for selecting each signal and outputting it to an external. Although the whole area photometry photodiode W0 measures light in the whole area, it may measure light in a partial area of the photographing area. This applies to other embodiments to be described later.

Figure 7:
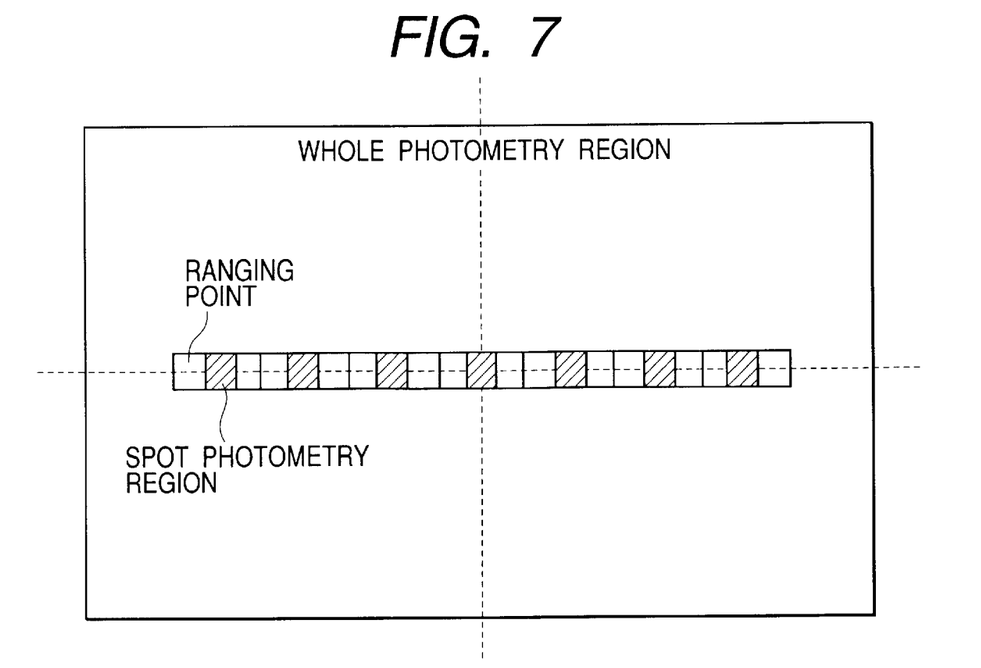
FIG. 7 is a diagram showing the optical positional relation between a ranging position and a spot photometry position of the first embodiment.

FIG. 7 is a diagram showing the optical positional relation between an AE sensor photometry region and an AF sensor ranging region. In this embodiment, it is characteristic that the positions of seven ranging points and the positions of seven spot photometry areas are in complete correspondence with each other. It is also characteristic that a photometry sensor is provided which measures light not only in a partial photometry region but also in the whole photometry region. In this embodiment, both the whole area photometry and the spot area photometry are performed to compare the photometry values so that it is possible to judge whether an object is in a front light scene or a rear light scene. For example, if the spot photometry value is smaller than the whole area photometry value, it means a rear light scene, whereas if both the photometry values are similar, it means a front light scene. Since the spot photometry is possible at all the ranging positions, the rear light scene can be detected even if an object is not in the central area of the scene.

In the embodiment, the AE and AF sensors are made of CMOS circuits so that they can be manufactured only by CMOS processes. Since various CMOS circuits (analog and digital) can be fabricated on a chip with good consistency, a variety of intelligent peripheral circuits can be fabricated on a chip. This embodiment can realize a multi-point ranging type AF sensor with a rear light detection AE function. The invention is applicable not only to CMOS sensors but also CCD, BASIS, SIT, SMD, AMI and the like.

Second Embodiment

Figure 8:
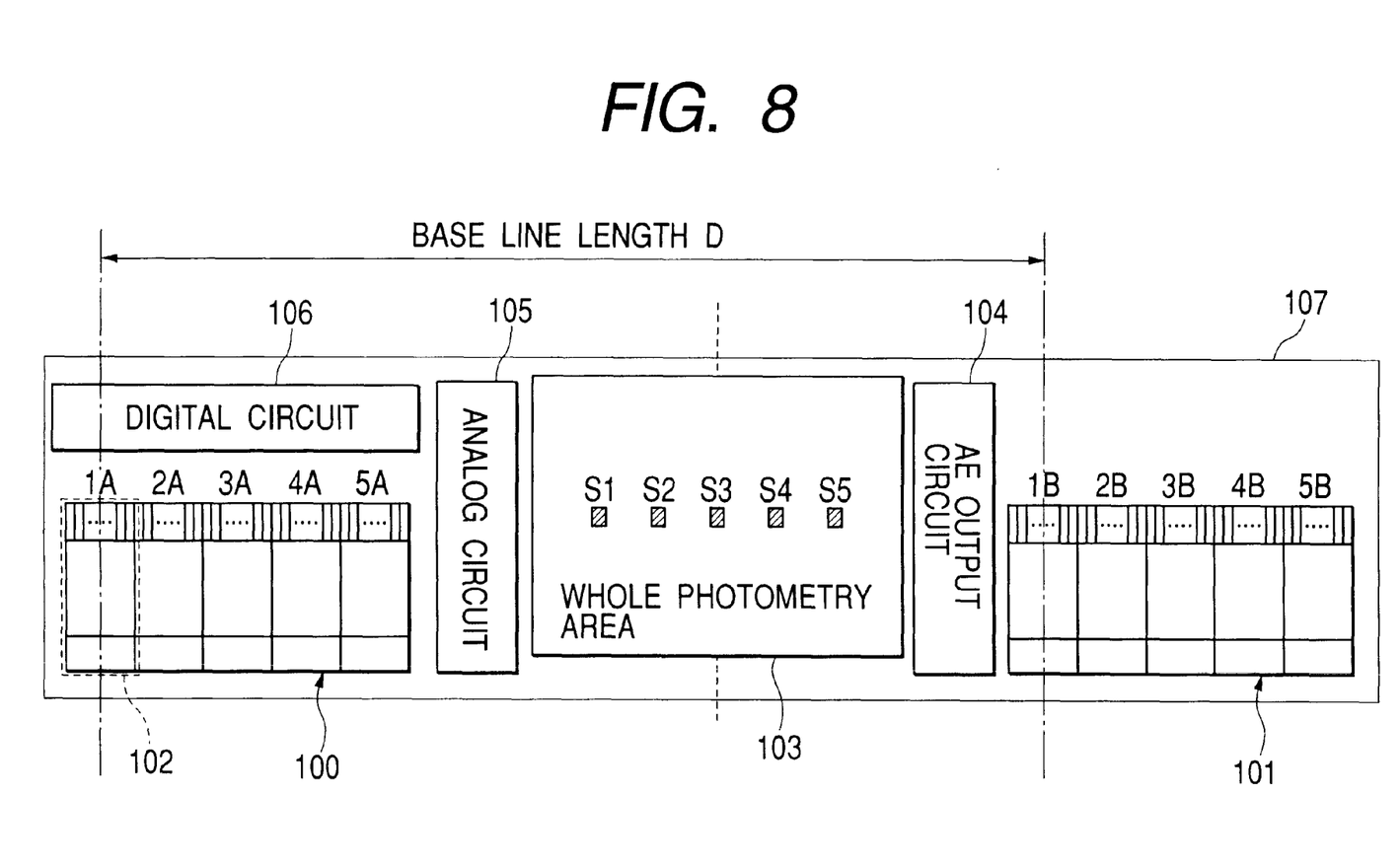
FIG. 8 is a plan view showing the layout of a photometry/ranging solid image pick-up device according to a second embodiment of the invention.

FIG. 8 is a plan view showing the layout of a photometry/ranging solid state image pick-up device according to a second embodiment of the invention. In the first embodiment, the layout for seven-point ranging is used, whereas in the second embodiment, as shown in FIG. 8 the layout for five-point ranging reduced by two points from the first embodiment is used. The other structures are similar to the first embodiment.

Figure 9:
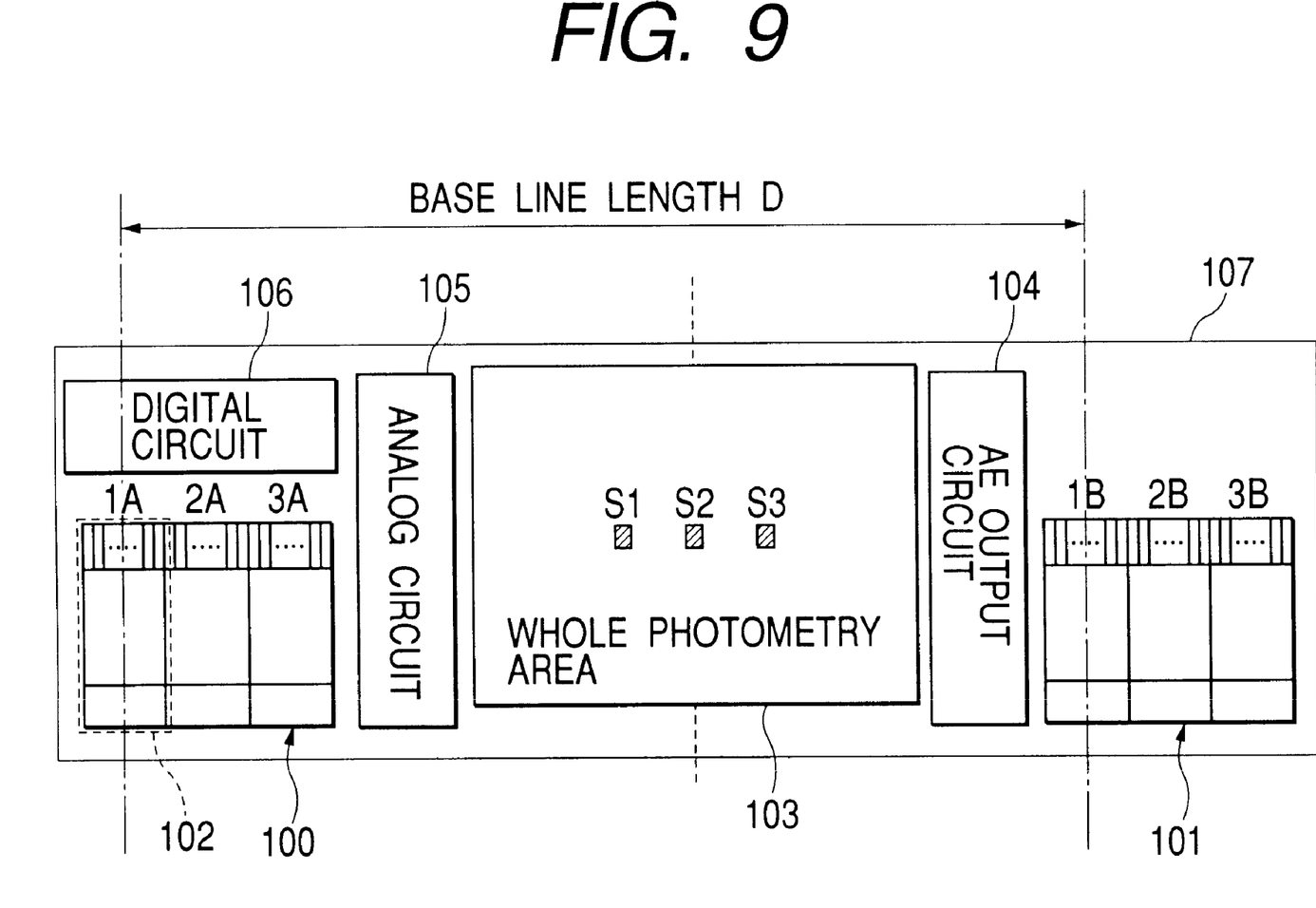
FIG. 9 is a plan view showing the layout of a photometry/ranging solid image pick-up device with three-point ranging changed from five-point ranging of the second embodiment.

As the seven-point ranging is reduced to the five-point ranging, the chip can further be made small. A three-point ranging such as shown in FIG. 9 may also be incorporated to make the chip smaller. The second embodiment reduces the number of ranging points so that a multi-point AF sensor with an AE function can be realized at a lower cost.

Third Embodiment

Figure 10:
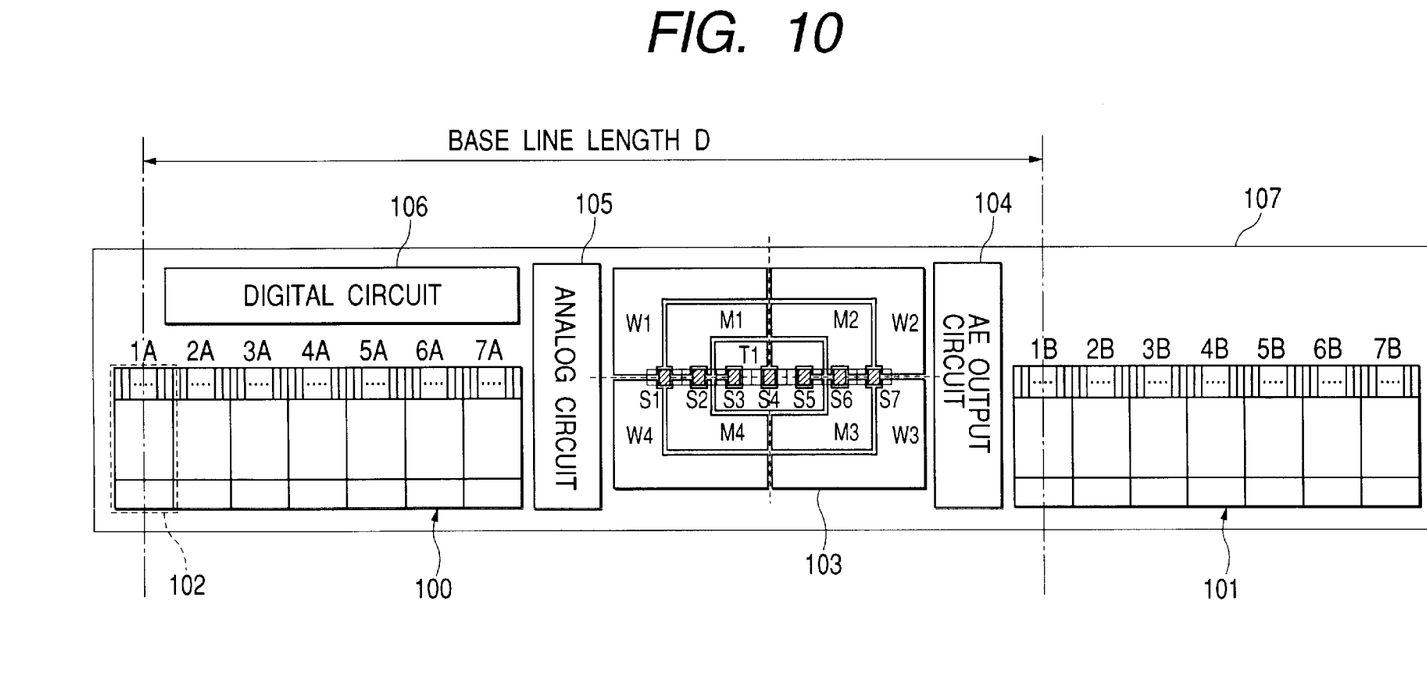
FIG. 10 is a plan view showing the layout of a photometry/ranging solid image pick-up device according to a third embodiment of the invention.
Figure 11A:
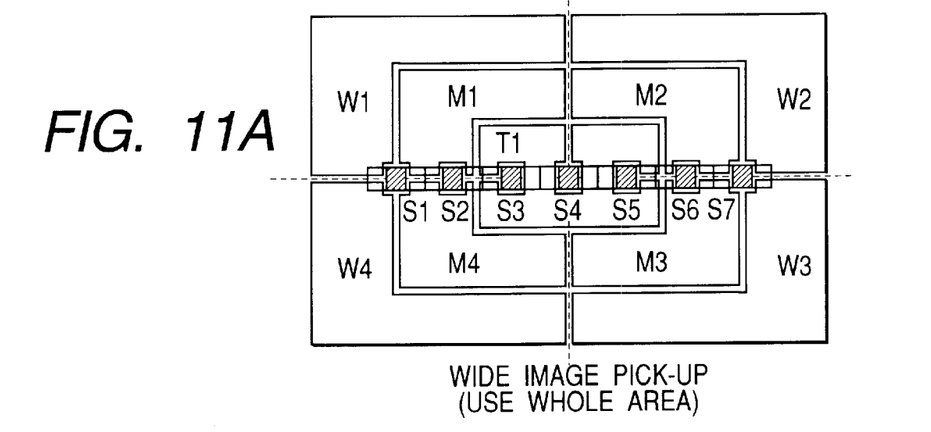
FIGS. 11A, 11B and 11C are diagrams illustrating a relation between a photographing area and a sensor.
Figure 11B:
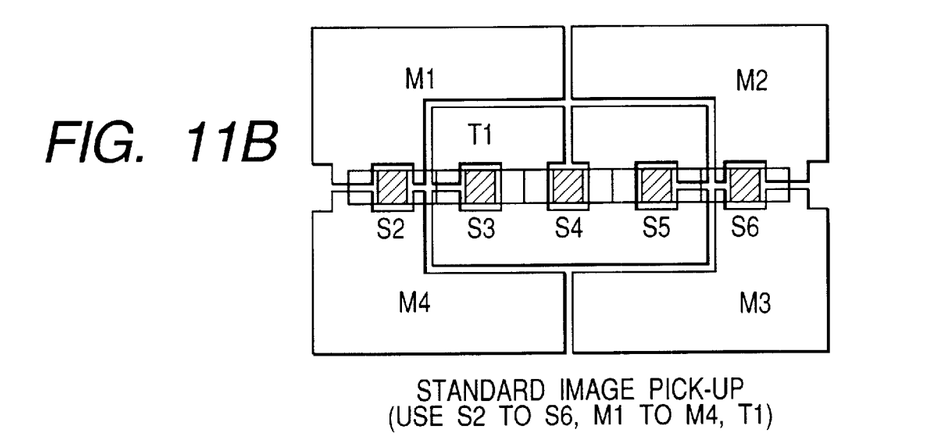
Figure 11C:
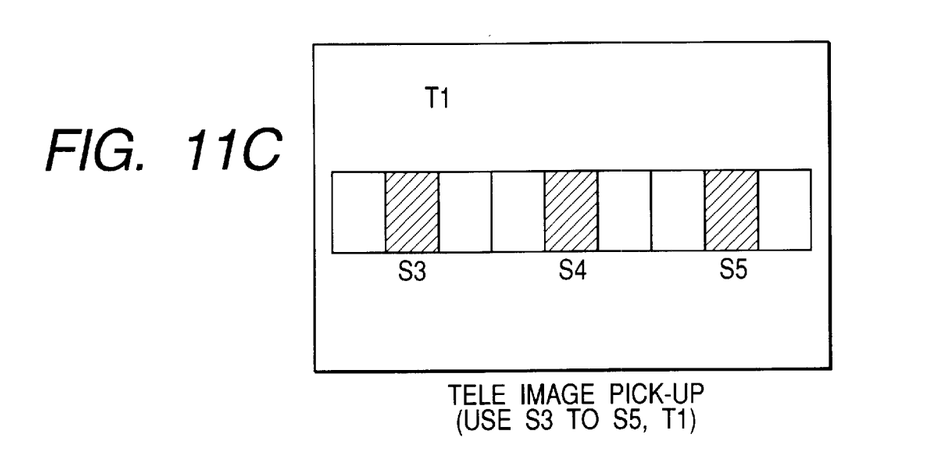

FIG. 10 is a plan view showing the layout of a third embodiment of the invention. The first and second embodiments use spot photometry AE sensors corresponding to respective photometry AE points and the whole area photometry AE sensor. In the third embodiment, the whole area photometry AE sensor is divided into a plurality of areas. Namely, an AE sensor photodiode area 103 is divided into W1 to W4, M1 to M4 and T1. By dividing the AE sensor photodiode area into a plurality of areas, a photometry precision can be improved. This arrangement is particularly effective when it is used for a camera having a zoom magnification of 3× or larger. FIGS. 11A to 11C show examples of AE and AF sensors used in respective zoom states (wide, standard, tele) when the whole area photometry AE sensor is divided into a plurality of areas.

FIG. 11A illustrates a wide image pick-up. In the wide image pick-up, photometry and ranging are performed by using all AE sensors (sixteen areas) and AF sensors (seven points). FIG. 11B illustrates a standard image pick-up. In the standard image pick-up, photometry and ranging are performed by using AE sensors (ten areas) including S2 to S6, M1 to M4, and T1 and AF sensors (five points) including 2A to 6A (2B to 6B). FIG. 11C illustrates a tele image pick-up. In the tele image pick-up, photometry and ranging are performed by using AE sensors (four areas) including S3 to S5, and T1 and AF sensors (three points) including 3A to 5A (3B to 5B).

By applying these sensors to a compact camera having a high zoom magnification and selectively using the multi-division AE areas and multi-point AF positions depending upon the zoom type, finer photometry becomes possible. This embodiment can realize a multi-point ranging type AF sensor with a rear light detection AE function.

Fourth Embodiment

Figure 12:
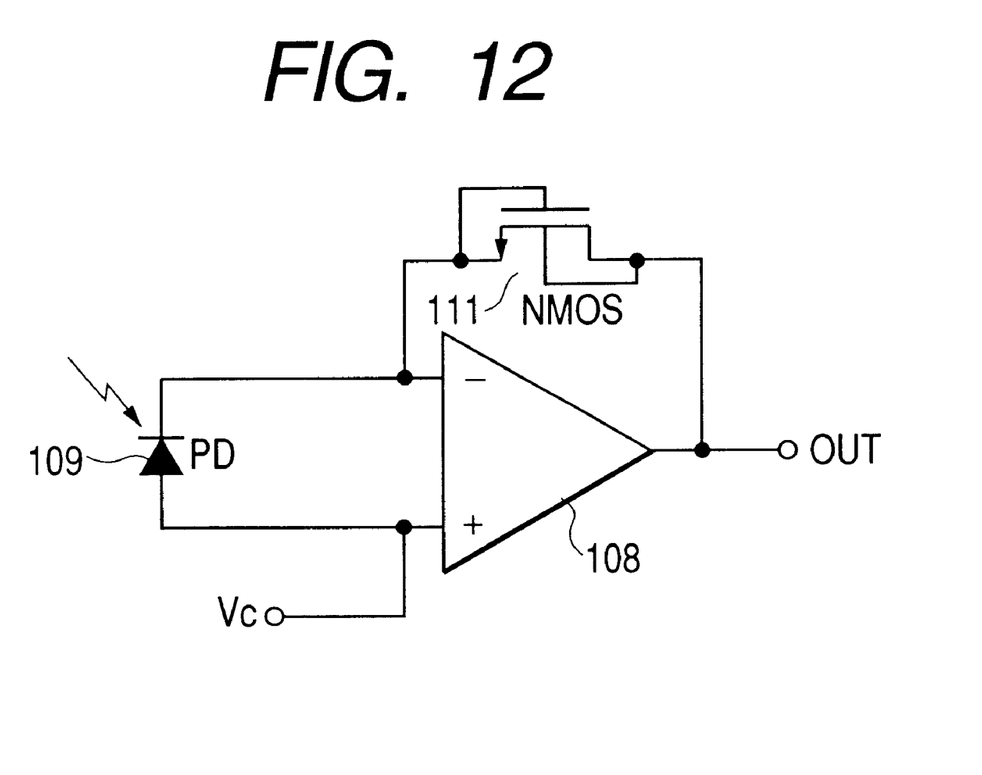
FIG. 12 is a diagram showing an AE sensor according to a fourth embodiment of the invention.

FIG. 12 is a circuit diagram of an AE sensor according to a fourth embodiment of the invention. In this embodiment, an NMOS transistor 111 is used for logarithmic compression. With this circuit structure, the pn junction diode 110 for logarithmic compression shown in FIG. 5 can be omitted. The other structure is similar to that shown in FIG. 5.

Fifth Embodiment

Figure 13:
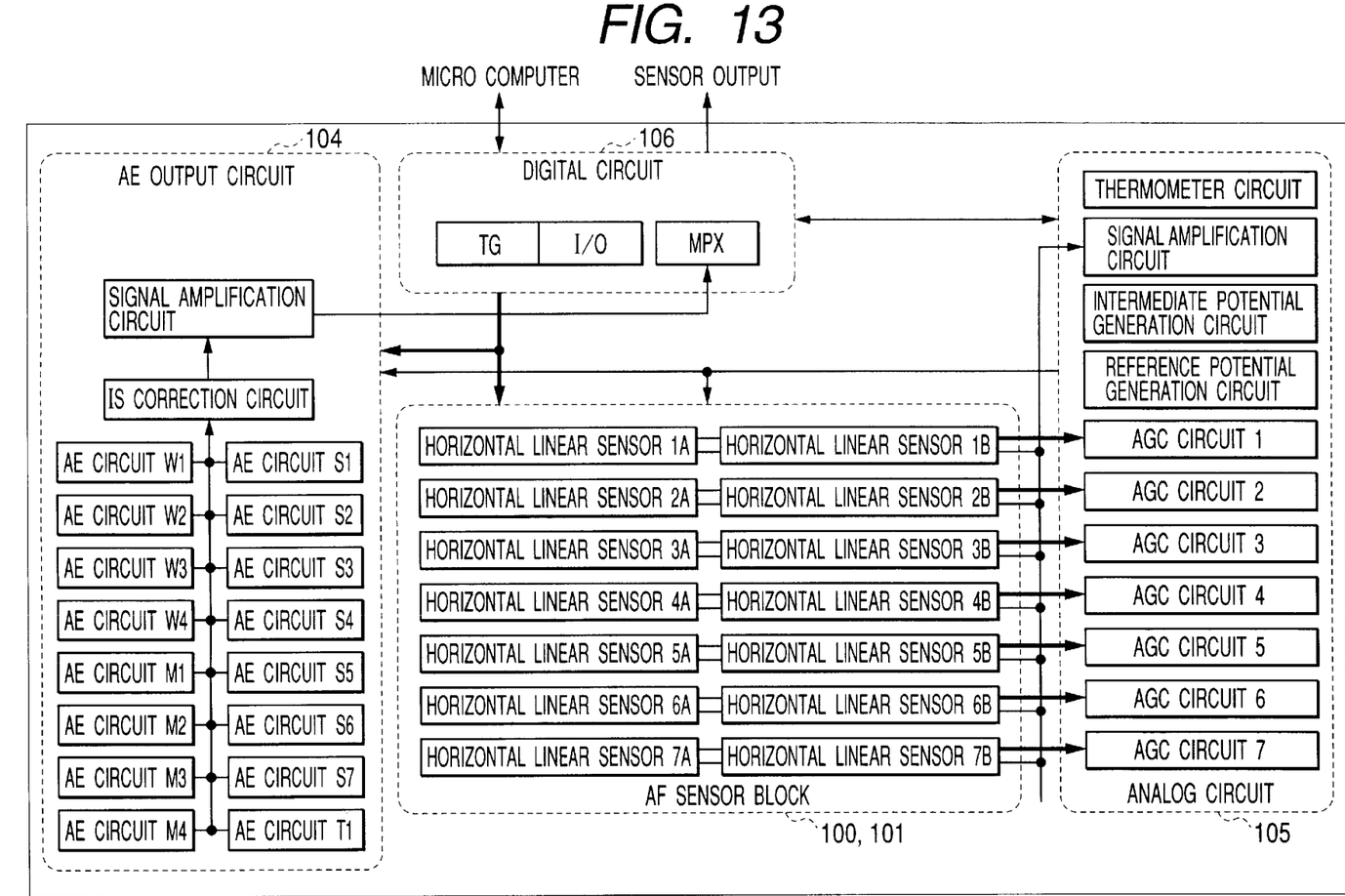
FIG. 13 is a circuit block diagram according to a fifth embodiment of the invention.
Figure 14:
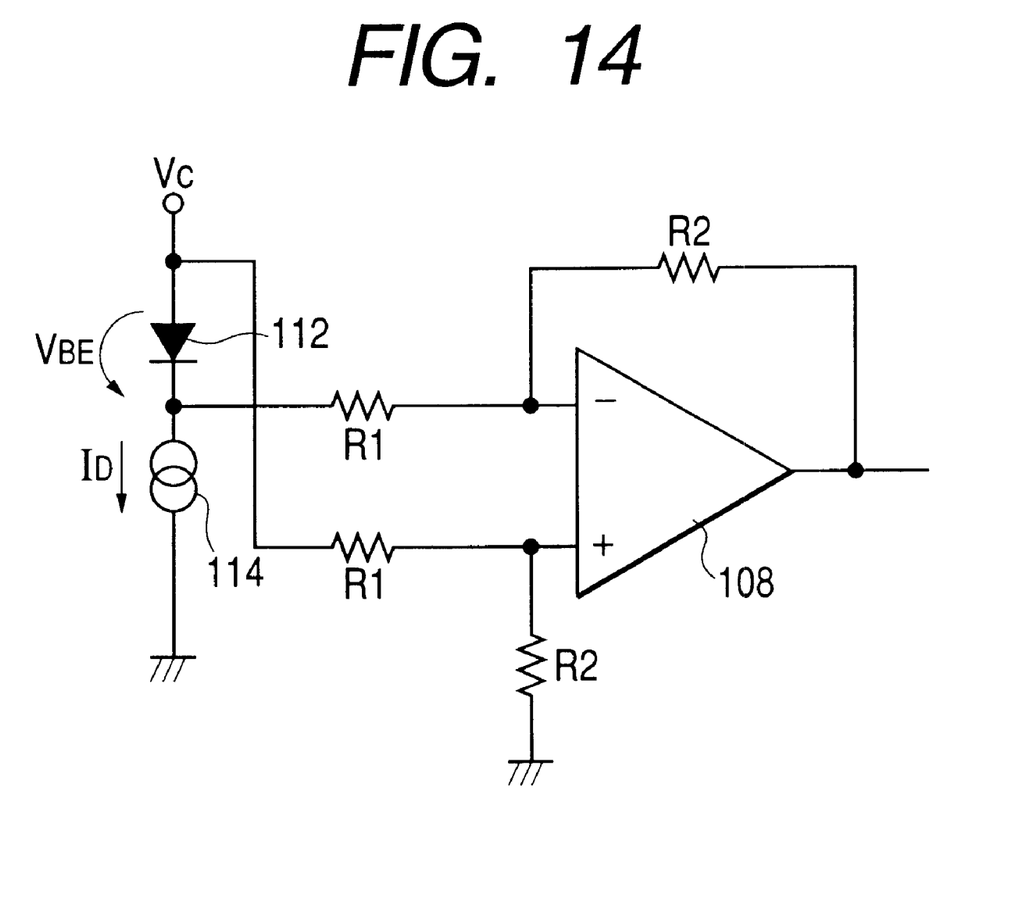
FIG. 14 is a diagram showing a thermometer circuit of the fifth embodiment.

FIG. 13 is a block diagram showing a fifth embodiment of the invention. This embodiment is characterized in that a thermometer circuit of a CMOS structure for monitoring a chip temperature is provided in the analog circuit 105. FIG. 14 shows an example of the thermometer circuit. This circuit utilizes the temperature characteristics (about −2 mV/° C.) of a pn junction. A temperature signal detected with a pn junction diode 112 is amplified by R2/R1 by a CMOS amplifier circuit 113 at the next stage and output to an external. A temperature of the chip measured with the thermometer circuit can be used as the data for correcting a dark current of the sensor. It is therefore possible to realize the photometry and ranging performances with high precision. In FIG. 14, reference numeral 114 represents a constant current source. In FIG. 13, the AE output circuit 104 includes AE circuits W1 to W4, AE circuits M1 to M4 and an AE circuit T1 which correspond to the solid state image pick-up device of the third embodiment.

This embodiment realizes a photometry/ranging solid state image pick-up device having AE sensors, AF sensors, TG, I/O and other various circuits which can be fabricated on a chip by CMOS processes. In this embodiment, since the thermometer circuit is built in, it is possible to realize a photometry/ranging solid state image pick-up device which can prevent the photometry and ranging performances from being degraded by high or low temperature.

Sixth Embodiment

Figure 15:
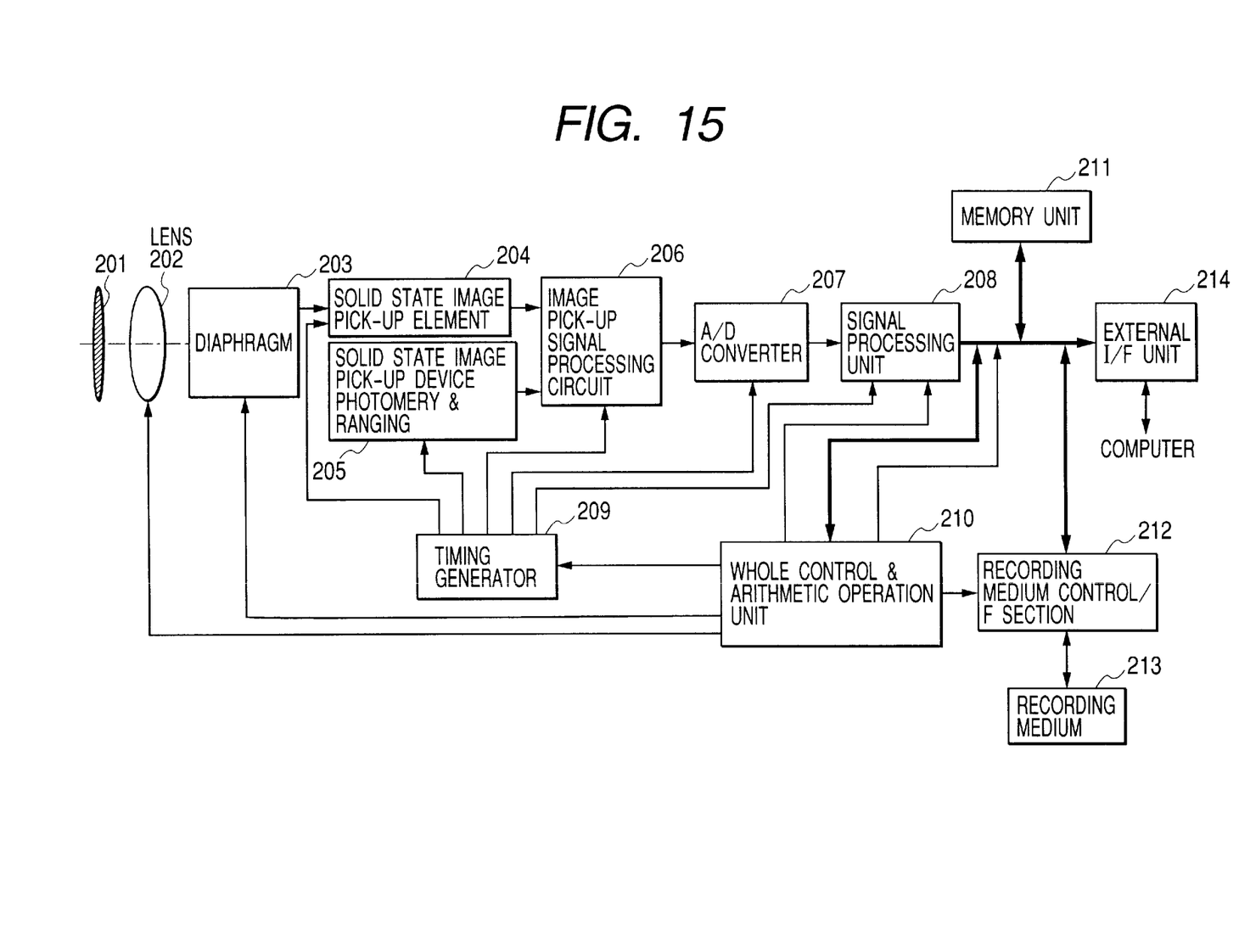
FIG. 15 is a block diagram showing an image pick-up apparatus using a photometry/ranging solid state image pick-up device of the invention.

Next, an image pick-up apparatus using a photometry/ranging solid state image pick-up device of one of the first to fifth embodiments will be described. FIG. 15 is a block diagram of a lens-shutter digital compact camera using the photometry/ranging solid state image pick-up device. In FIG. 15, reference numeral 201 represents a barrier which functions as both a protector of a lens and a main switch. Reference numeral 202 represents a lens for focusing an optical image of an object on a solid state image pick-up element 204. Reference numeral 203 represents a diaphragm for changing the amount of light passed through the lens 202. The solid state image pick-up element 204 converts an optical image of the object focused by the lens 202 into an image signal.

Reference numeral 205 represents a photometry/ranging solid state image pick-up device of one of the first to fifth embodiments, for example, the first embodiment shown in FIGS. 1 and 2. Reference numeral 206 represents an image pick-up signal processing circuit which processes an image signal, a photometry signal and a ranging signal output from the solid state image pick-up element 204 and photometry/ranging solid state image pick-up device 205. Reference numeral 207 represents an A/D converter for converting an analog signal output from the image pick-up signal processing circuit 206 into a digital signal. Reference numeral 208 represents a signal processing unit for performing various corrections and compression of image data output from the A/D converter 207. Reference numeral 209 represents a timing generator for supplying various timing signals to the solid state image pick-up element 204, image pick-up signal processing circuit 206, A/D converter 207, signal processing unit 208 and the like. Reference numeral 210 represents a whole control and arithmetic operation unit which performs various calculations and controls the entirety of the camera. Reference numeral 211 represents a memory unit for temporarily storing image data.

Reference numeral 212 represents a recording medium control interface (I/F) section for reading data from and writing data into a removable recording medium 213 such as a semiconductor memory. Reference numeral 214 represent an external interface unit for communication with an external computer or the like.

Next, an photographing operation to be executed by the lens-shutter digital compact camera constructed as above will be described. When the barrier 201 is opened, a main power source turns on. Then, another power source for control circuits turns on and another power source for image pick-up circuits such as A/D converter 207 turns on. In order to control an exposure amount, the whole control and arithmetic operation unit 210 fully opens the diaphragm 203 and thereafter calculates an exposure amount in accordance with the data output from the signal processing unit 208 which received signals of AE sensors of the photometry/ranging solid state image pick-up device 205 via the A/D converter 207.

In accordance with the brightness determined from the photometry, the whole control and arithmetic operation unit 210 adjusts the diaphragm 203. The whole control and arithmetic operation unit 210 also calculates a distance to an object through phase difference detection by using signals output from AF sensors of the photometry/ranging solid state image pick-up device 205. Thereafter, the lens 205 is driven to check whether an in-focus state is obtained. If not, the lens 202 is again driven to perform ranging and automatic focusing.

After an in-focus state is confirmed, main exposure starts. After the main exposure, an image signal output from the solid state image pick-up element 204 is A/D converted by the A/D converter 207, supplied to the signal processing unit 208, and stored in the memory unit 211 under the control of the whole control and arithmetic operation unit 210. Under the control of the whole control and arithmetic operation unit 210, the image data stored in the memory unit 211 is recorded in the removable recording medium 213 via the recording medium control I/F section 212. The image data may be supplied directly to an external computer or the like via the external I/F unit 214.

The photometry/ranging solid state image pick-up device is applicable not only to a digital compact camera but also to a silver salt camera and the like.

As described above, according to the invention, a solid state image pick-up device having high performance AE and multi-point AE functions can be realized on a single chip by fabricating ranging photoelectric conversion element columns for multi-point ranging of a photographing area, first photometry photoelectric conversion elements for spot photometry of ranging positions, and a second photometry photoelectric conversion element for photometry of the photographing area, respectively on the same semiconductor substrate. By using the photometry/ranging solid state image pick-up device together with a lens-shutter compact camera or the like, the camera which is compact and has high performance and low cost can be realized. By comparing a spot photometry value with a whole area (or partial area) photometry value, it becomes possible to distinguish between a front light scene and a rear light scene.

What is claimed is:
1. A solid state image pick-up device comprising:
   a plurality of ranging photoelectric conversion elements for multi-point ranging and automatic focusing of a photographing area;

first photometry photoelectric conversion elements for spot photometry of each ranging position of each of said ranging photoelectric conversion elements; and a second photometry photoelectric conversion element for photometry of the photographing area, wherein said ranging photoelectric conversion elements, said first photometry photoelectric conversion elements and said second photometry conversion element are integrated on a same semiconductor substrate.

2. A solid state image pick-up device according to claim 1, wherein said ranging photoelectric conversion elements comprise a linear sensor.

3. A solid state image pick-up device according to claim 2, wherein said ranging photoelectric conversion elements comprise a plurality of said linear sensors.

4. A solid state image pick-up device according to claim 1, wherein said second photometry photoelectric conversion element is divided into a plurality of regions.

5. A solid state image pick-up device according to claim 4, wherein a plurality of divided regions of said second photometry photoelectric conversion element are selectively used in accordance with an angle of view.

6. A solid state image pick-up device according to claim 1 or claim 5, wherein each of said first and second photometry photoelectric conversion elements includes a pn junction photodiode in a zero bias state and logarithmic compression conversion means for logarithmically compressing and voltage-converting photoelectric current output from the pn junction photodiode.

7. A solid state image pick-up device according to claim 1, wherein said ranging photoelectric conversion elements are selectively used in accordance with an angle of view.

8. A solid state image pick-up device according to any one of claims 1 to 3 and claim 5, wherein the solid state image pick-up device is made of CMOS circuits.

9. A solid state image pick-up device according to claim 1, further comprising at least one analog circuit or one AE output circuit between said ranging photoelectric conversion elements and said photometry photoelectric conversion elements.

10. A solid state image pick-up device according to claim 9, wherein said analog circuit includes an AGC circuit.

11. A solid state image pick-up device according to claim 1, wherein a digital circuit such as timing generator and I/O circuit is integrated together on said semiconductor substrate.

12. A solid state image pick-up device according to claim 1, further comprising means for logarithmically compressing photoelectric current output from each of said first and second photometry photoelectric conversion elements, means for controlling an accumulation time of said ranging photoelectric conversion elements, a timing generator circuit for driving said ranging photoelectric conversion elements and said first and second photometry photoelectric conversion elements, a band gap circuit for generating a reference potential, and a thermometer circuit for monitoring a temperature of the same semiconductor substrate, respectively integrated on the same semiconductor substrate.

13. A solid state image pick-up device according to claim 12, wherein said logarithmically compressing means, said controlling means, said timing generator circuit, said band gap circuit, and said thermometer circuit are made of CMOS circuits.

14. An image pick-up apparatus comprising:

a solid state image pick-up device comprising:

a plurality of ranging photoelectric conversion elements for multi-point ranging and automatic focusing of a photographing area, first photometry photoelectric conversion elements for spot photometry of each ranging position of each of said ranging photoelectric conversion elements, and a second photometry photoelectric conversion element for photometry of the photographing area, wherein said ranging photoelectric conversion elements, said first photometry photoelectric conversion elements and said second photometry conversion element are integrated on a same semiconductor substrate;

a detection region for detecting an object image;

a lens for focusing light to said detection region; and a signal processing circuit for performing ranging and photometry controls in accordance with a signal supplied from said solid state image pick-up device.

15. A camera comprising:

a solid state image pick-up device comprising:

a plurality of ranging photoelectric conversion elements for multi-point ranging and automatic focusing of a photographing area, first photometry photoelectric conversion elements for spot photometry of each ranging position of each of said ranging photoelectric conversion elements, and a second photometry photoelectric conversion element for photometry of the photographing area, wherein said ranging photoelectric conversion elements, said first photometry photoelectric conversion elements and said second photometry conversion element are integrated on a same semiconductor substrate;

a detection region for detecting an object image;

a lens for focusing light to said detection region; and a signal processing circuit for performing ranging and photometry controls in accordance with a signal supplied from said solid state image pick-up device.

* * * * *